United States Patent [19]
Minoura et al.
[11] Patent Number: 4,937,403
[45] Date of Patent: Jun. 26, 1990

[54] POWER SOURCE SWITCHING DEVICE

[75] Inventors: Junichi Minoura, Kasugai; Hisayuki Nagase, Nagoya, both of Japan
[73] Assignee: Aichi Electric Works Co., Ltd., Nagoya, Japan

[21] Appl. No.: 287,047
[22] Filed: Dec. 21, 1988
[30] Foreign Application Priority Data
Aug. 2, 1988 [JP] Japan ................................ 63-192058
[51] Int. Cl.[5] ........................... H01H 9/20; H02B 9/00
[52] U.S. Cl. ................................ 200/50 AA; 361/337; 307/80
[58] Field of Search ......... 200/5 R, 17 R, 18, 50 AA, 200/50 C; 307/43, 64, 65, 69, 80, 85; 361/337, 339, 343

[56] References Cited
U.S. PATENT DOCUMENTS
4,157,461 6/1979 Witkor .............................. 307/64 X
4,295,053 10/1981 Kovatch et al. ...................... 307/64
4,398,097 8/1983 Schell et al. .......................... 307/64
4,423,336 12/1983 Iverson et al. ........................ 307/64

*Primary Examiner*—J. R. Scott
*Attorney, Agent, or Firm*—Fleit, Jacobson, Cohn, Price, Holman & Stern

[57] ABSTRACT
In construction of a switching device interposed between a pair of power sources and a load circuit and provided with switch and by-pass units, the switch unit is extractable from its housing and operation of the by-pass circuit is interlocked with position of the switch unit with respect to the housing so that the load circuit should be selectively connected to one of the two power sources. For convenience in maintenance and/or operation of device elements, shift of connection of the load circuit from one to the other power source can be performed by an interlocked operation of the two units without any contact damage and incorrect power source connection.

3 Claims, 9 Drawing Sheets

POWER SOURCE SWITCHING DEVICE

BACKGROUND OF THE INVENTION

The present invention relates to an improved power source switching device, and more particularly relates to improvements in selective switching of a connection to two different power sources such as an ordinary power source, and an emergency power source, for testing and maintenance of device elements without interception of power supply.

A typical conventional fixed-type switching device is provided with two input terminals and one output terminal. The first input terminal is connected to the first power source, such as an ordinary power source, the second input terminal is connected to the second power source, such as an emergency power source and the output terminal is connected to a load circuit. The switching device is further provided with two contacts. The first contact is used for separable connection between the first input terminal and the output terminal and the second contact is used for separable connection between the second input terminal and the output terminal.

With this construction, the output terminal is manually or magnetically connected to either of the first and second contact for selection of the load circuit to one of the power sources. The first and second contacts are generally interlocked electrically and mechanically in order to avoid concurrent closure.

For testing and/or maintenance of device elements, the switching device fixed to a wall or a post has to be fully disconnected from the power sources. In this case, power supply to the load circuit is inevitably intercepted. When the load circuit includes one or more important electric appliances which allow no interception of power supply, no testing and/or maintenance of the switching device can be carried out.

It is possible to directly connect these electric appliances to the ordinary power source by means of a by-path unit. In this case, however, the two contacts of the switching device must be reliably interlocked with the by-pass unit. Otherwise the two power sources may be incorrectly connected to the electric appliances and/or contacts of the by-pass unit may be seriously damaged by arc discharge.

SUMMARY OF THE INVENTION

It is an object of the present invention to enable selective switching of connection to two different power sources without any danger of incorrect connection and contact damages due to arc discharge.

In accordance with this aspect of the present invention, a switching device interposed between a pair of power sources and a load circuit is provided with switch and by-pass units, the switch unit is extractable from its housing and operation of the by-pass unit is interlocked with position of the switch unit with respect to the housing so that the load circuit should be selectively connected to one of the two power sources.

DESCRIPTION OF THE PREFERRED EMBODIMENTS

Although the following descriptions are directed to embodiments of the three-phase three-wire power supply system, the present invention is well applicable to other types of power supply systems by addition of adequate self-evident modifications.

Figure 1:
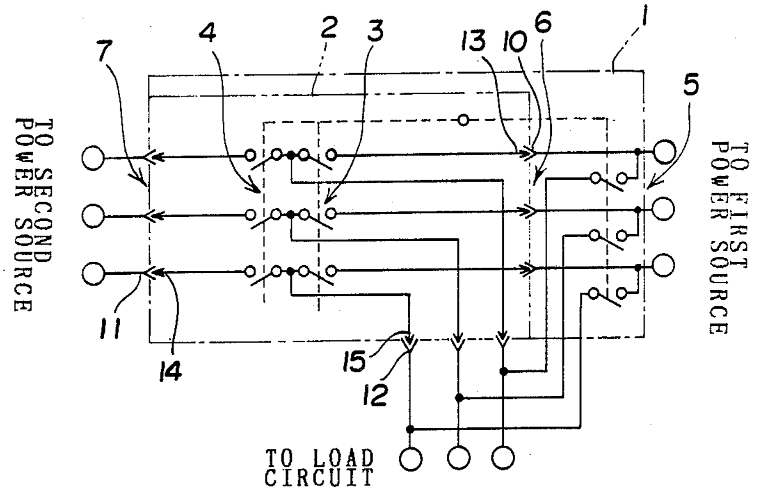
FIG. 1 is a circuit diagram of one embodiment of the switching device in accordance with the present invention.

In FIG. 1, a switching device 1 in accordance with the present invention is provided with a switch unit 2 which includes two sets of three-phase contacts 3 and 4. In the case of this example, the first contact 3 connects a load circuit to the first power source such as an ordinary power source whereas the second contact 4 connects the load circuit to the second power source such as an emergency power source. The switching device 1 is further provided with a three-phase by-pass unit 5 which connects the first power source to the load circuit without passage through the switch unit 2. The switch unit 2 is connected to the first and second power sources via circuit breakers 6 and 7. The first and second contacts 3, 4 of the switch unit 2 and the by-pass units 5 are manually or magnetically operable.

Figure 4:
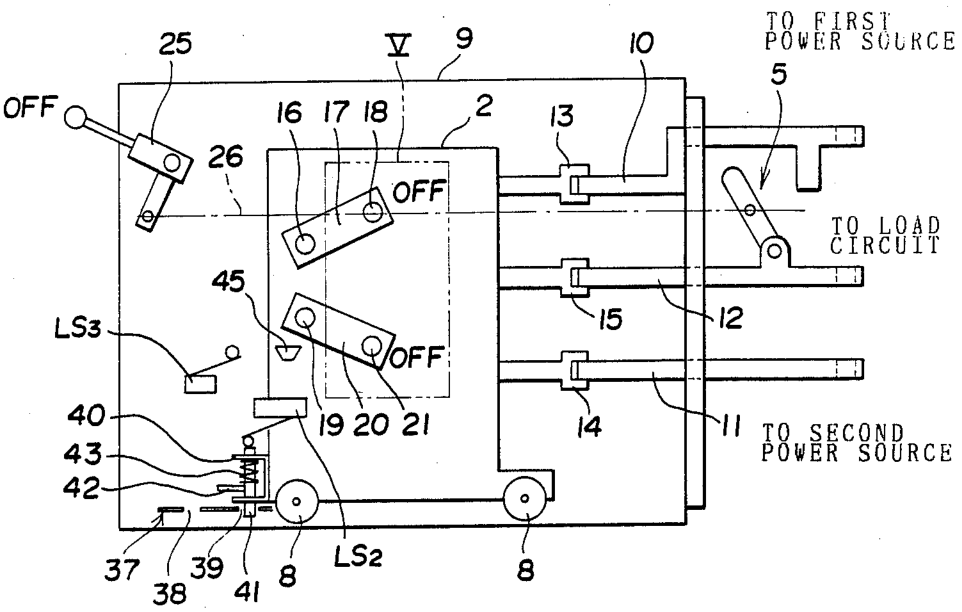
FIG. 4 is a side view, partly removed, of the device shown in FIG. 1.

As best seen in FIG. 4, the switch unit 2 is provided with bottom wheels 8 and extractably encased in a housing 9. The housing 9 is provided with the first contact piece 10 connected to the first power source, the second contact piece 11 connected to the second power source and the third contact piece 12 connected to the load circuit.

The switch unit 2 is provided with two input contact pieces 13 and 14 and an output contact piece 15 on the rear side. In the operative position of the switch unit 2 inserted into the housing 9, the first input contact piece 13 comes into contact with the first contact piece 10, the second input contact piece 14 with the second contact piece 11 and the output contact piece 15 with the third contact piece 12, respectively. The first input contact piece 13 and the output contact piece 15 are separably connected one another by the first contact 3 and the second input piece 14 and the output piece 15 are separably connected one another by the second contact 4, both in the switch unit 2 shown in FIG. 1.

The by-pass unit 5 is arranged outside the housing 9 for direct separable connection between the first contact piece 10 connected to the first power source and the third contact piece 12 connected to the load circuit.

Figure 2:
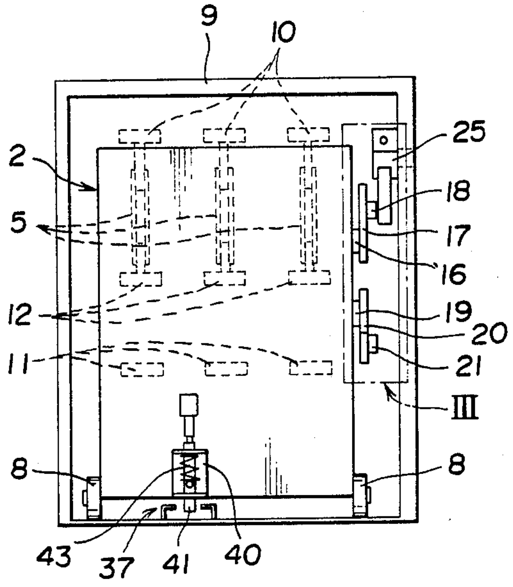
FIG. 2 is a front view of the device shown in FIG. 1.

As seen in FIGS. 2 and 4, the first shaft 16 projects outwards through a side wall of the housing 9 to fixedly carry one end of the first lever 17 which extends along the side wall. The final shaft 16 rotates in response to closure of the first contact 3 in the switch unit 2. The other end of the first lever 17 is provided with first hook pin 18. Similarly at a level below the first shaft 16, the second shaft 19 projects outwards through the side wall to fixedly carry one end of the second lever 20 which extends also along the side wall. The second shaft 19 rotates in response to closure of the second contact 4 in the switch unit 2. The other end of the second lever 20 is provided with the second hook pin 21.

Figure 5:
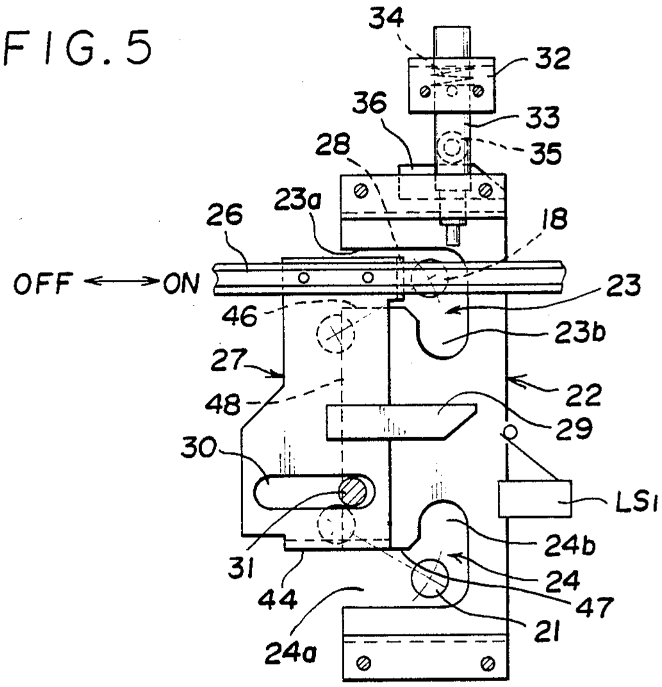
FIG. 5 is a side view of a part V in FIG. 4.
Figure 6:
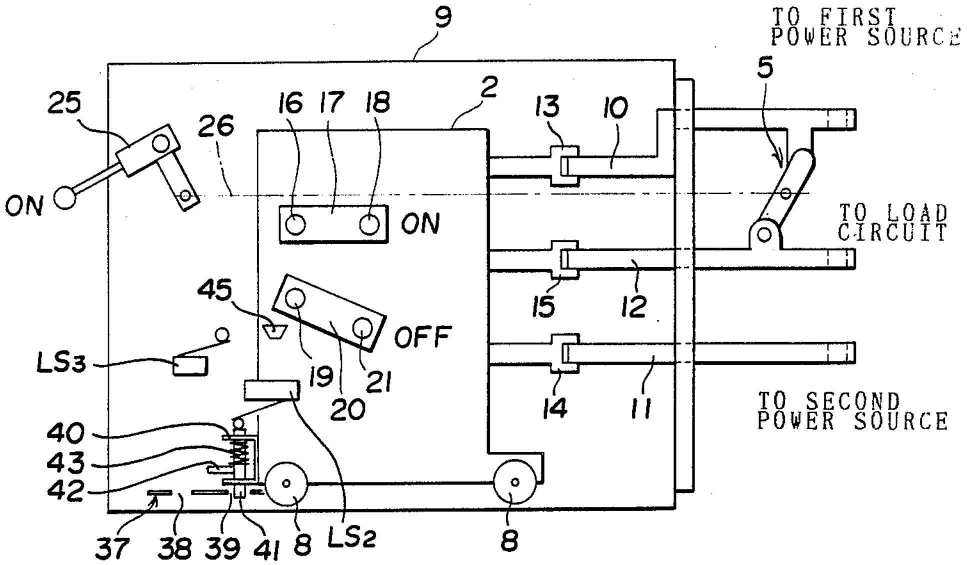
FIG. 6A is a side view of the device shown in FIG. 1 with the switch unit being partly closed.
FIG. 6B is a side view of the part V in FIG. 4 with the switch unit being partly closed but the by-pass unit being still left open.
FIG. 6C is a side view of the part V with the by-pass unit being closed.
FIG. 6D is a circuit diagram in a state in which the switch unit is partly closed and the by-pass unit is closed.
Figure 6:
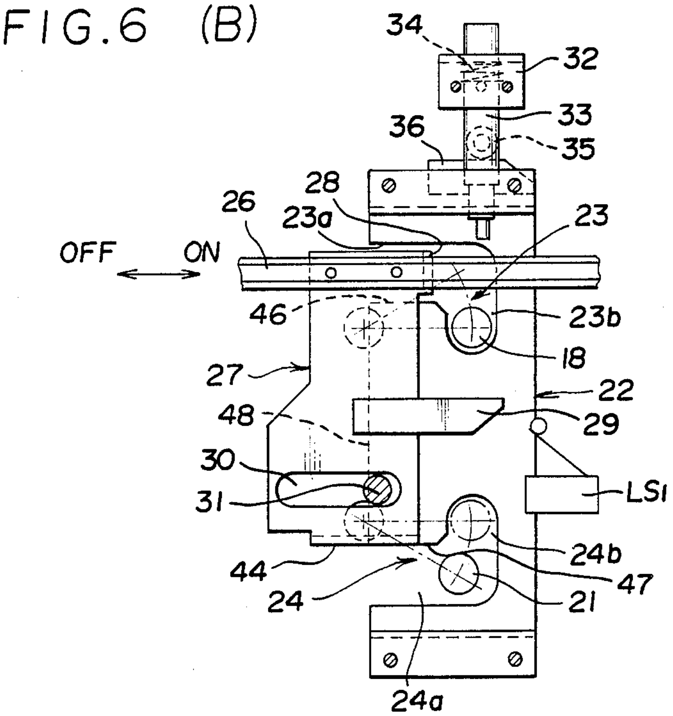
Figure 6:
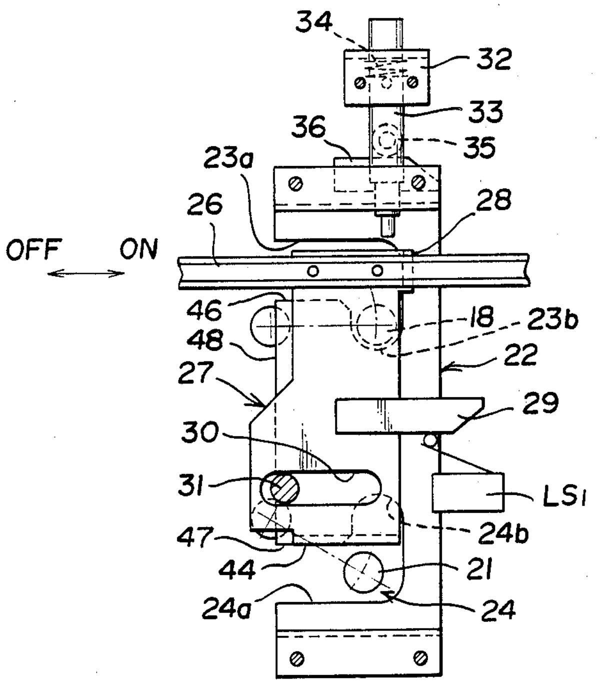
Figure 6:
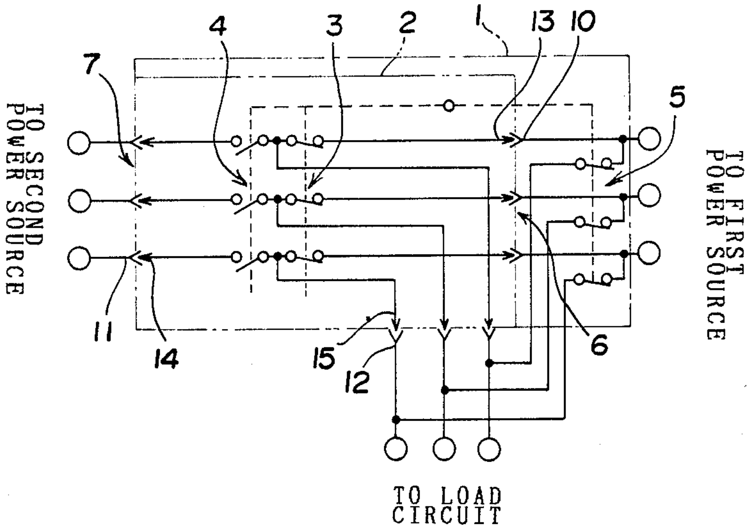
Figure 7:
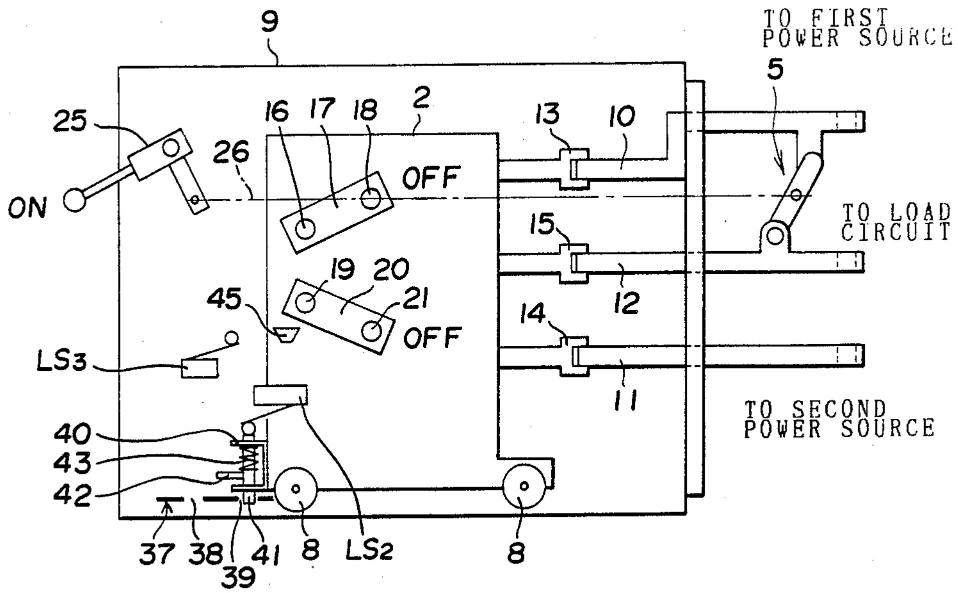
FIG. 7A is a side view of the device shown in FIG. 1 with the switch unit being fully open.
FIG. 7B is a side view of the part V in FIG. 4 with the switch unit being fully open but the by-pass unit being fully closed.
FIG. 7C is a circuit diagram in a state in which the switch unit is fully open but the by-pass unit is fully closed.
Figure 7:
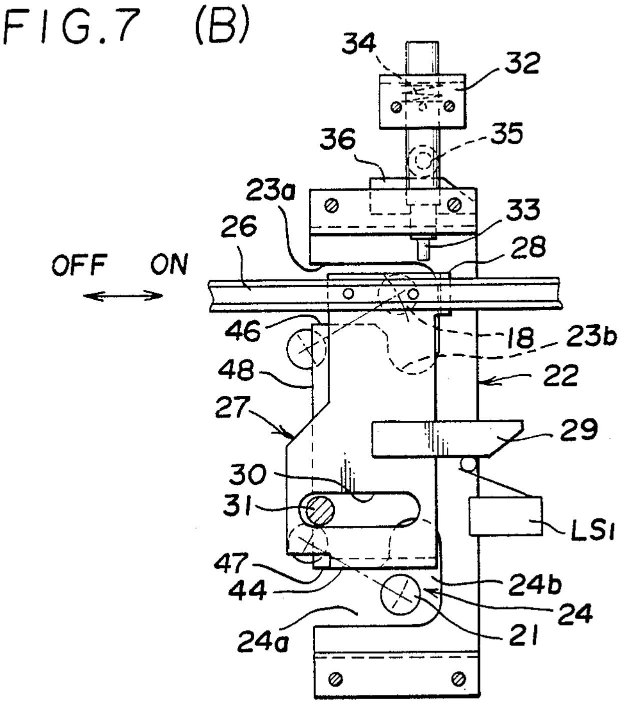
Figure 7:
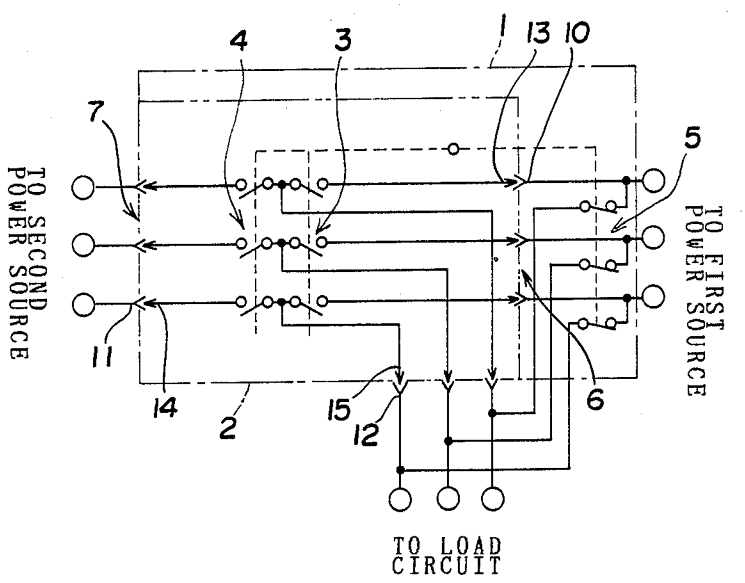
Figure 8:
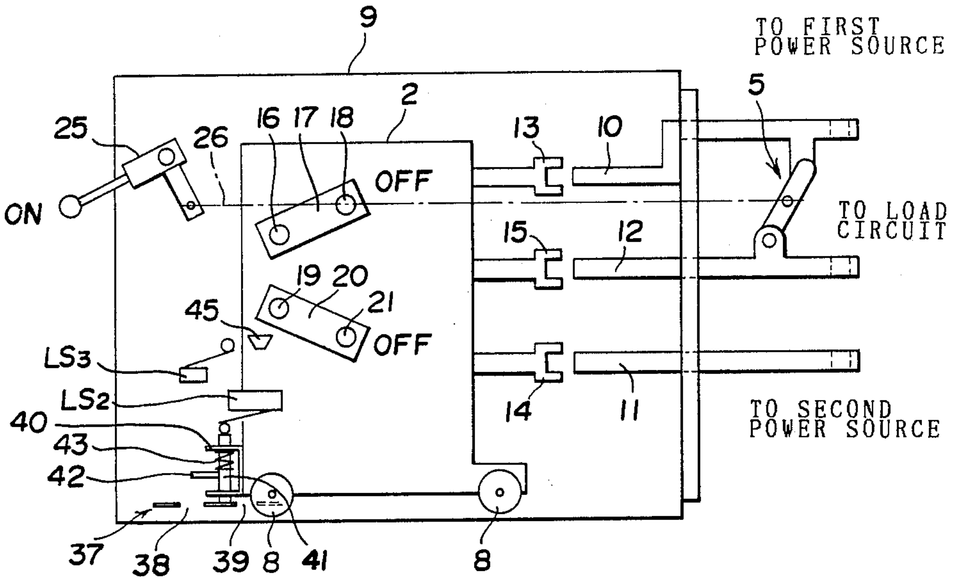
FIG. 8A is a side view of the device shown in FIG. 1 with the switch unit being located between the operative and inoperative positions.
FIG. 8B is a side view of the part V in FIG. 4 in the state shown in FIG. 8A.
FIG. 8C is a circuit diagram in the state shown in FIG. 8A.
Figure 8:
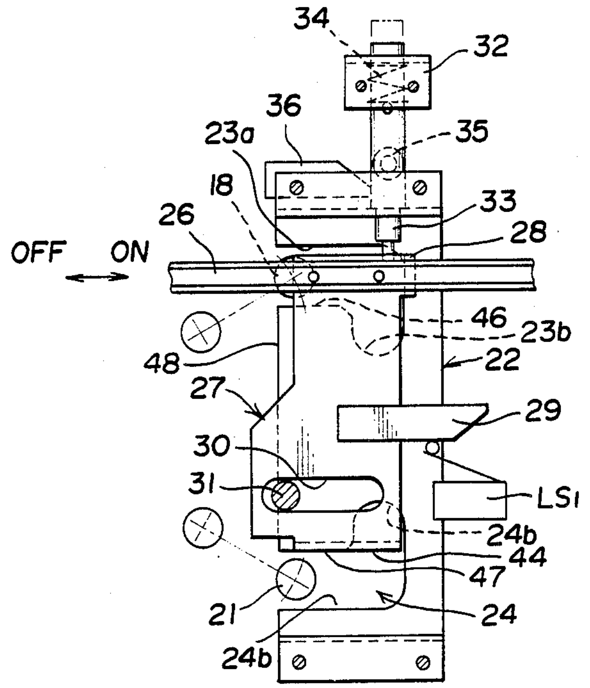
Figure 8:
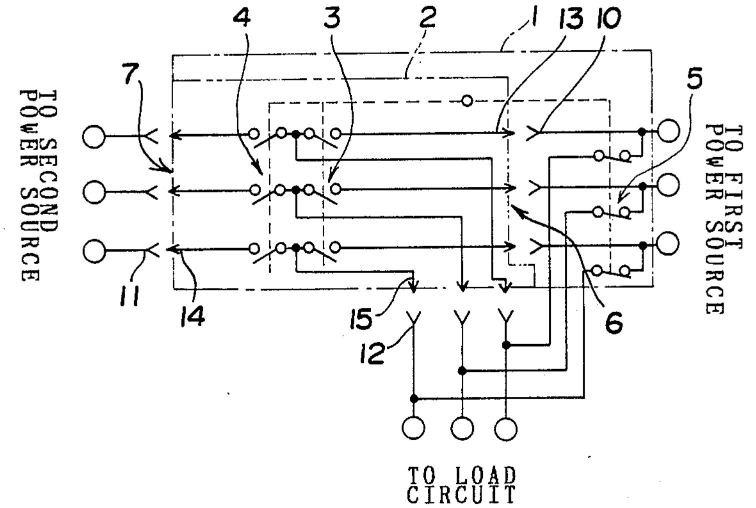
Figure 9:
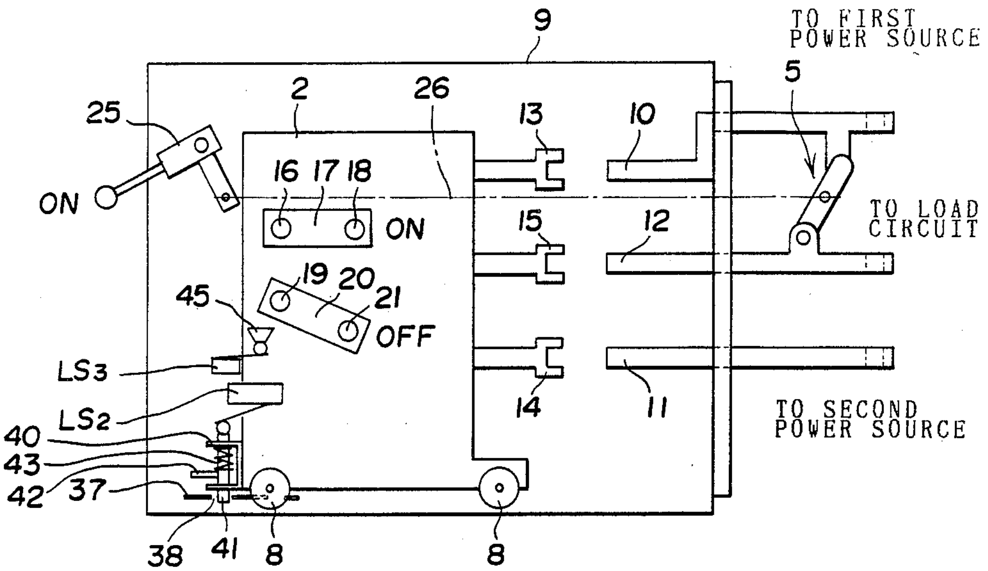
FIG. 9A is a side view of the device shown in FIG. 1 with the switch unit being registered at the inoperative position.
FIG. 9B is a side view of the part V in FIG. 4 in the state shown in FIG. 9A.
FIG. 9C is a circuit diagram in a state in which the switch unit is partly closed and the by-pass unit is fully closed.
Figure 9:
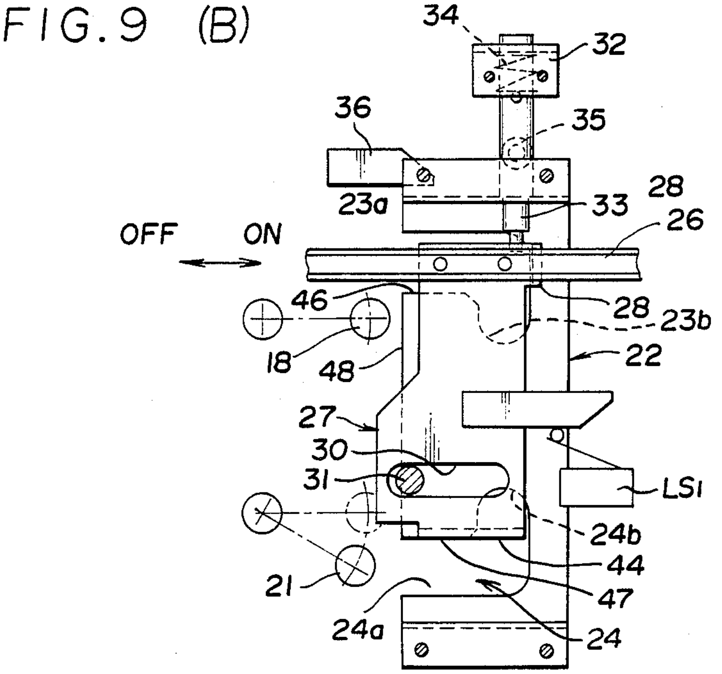
Figure 9:
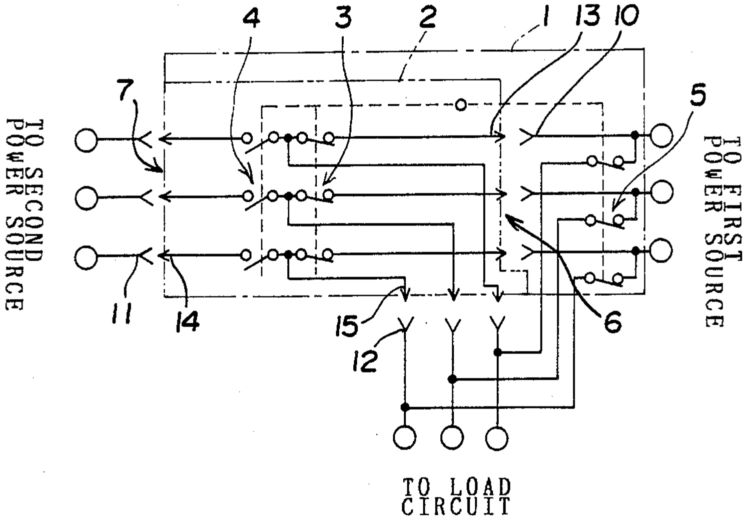
Figure 10:
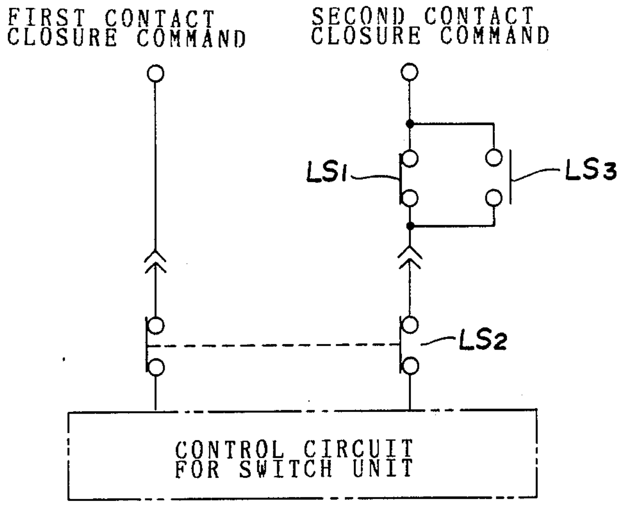
FIG. 10 is a circuit diagram for showing flow of closure commands.

In the vicinity of the hook pins 18 and 21 is a guide plate 22 fixed to the inner face of a corresponding side wall of the housing 9 whilst extending in the vertical direction. As best seen in FIG. 5, the guide plate 22 is provided with a pair of L-shaped slots 23 and 24 spaced vertically from each other. The upper slots 23 is made up of a horizontal section **23*a* and a vertical section 23*b* directed downwards whilst the lower slot 24 is made up of a horizontal section 24*a* and a vertical section 24*b* directed upwards. When the switch unit 2 is at the operative position in the housing 9, the upper slot 23 receives the first hook pin 18 on the first lever 16 and the lower slot 24 receives the second hook pin 21 on the second lever 20. More specifically, the hook pins 18 and 21 are positioned in the horizontal sections 23*a* and 24*a* of the slots 23 and 24, respectively, when the switch unit 2 is inserted into the operative position in the housing 9. The hook pins 18 and 21 rotate in the vertical sections 23*b* and 24*b* of the slots 23 and 24, respectively, when the contacts 3 and 4 in the switch unit 2 are closed. At closed states of the contacts 3 and 4, the hook pins 18 and 21 are positioned at the ends of the vertical sections 23*b* and 24*b* to inhibit unintended extraction of the switch unit 2 from the housing 9**.

Figure 3:
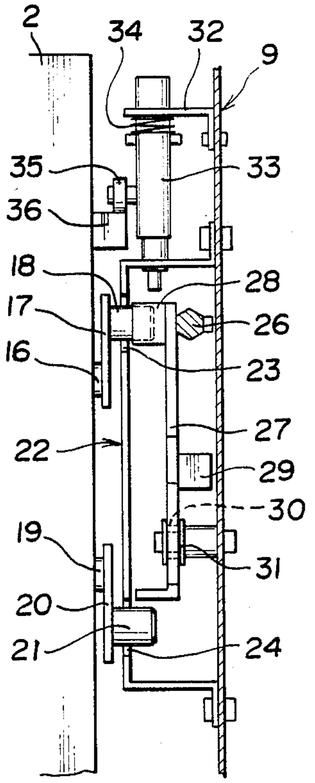
FIG. 3 is an enlarged front view of a part III in FIG. 2.

As shown in FIG. 4, a control lever 25 for the by-pass unit 5 is pivoted to one side wall of the housing 9 partly extending outside the housing 9. The inner end of the control lever 25 is pivoted to one end of a connecting rod 26 which transmits movement of the control lever 25 to the by-pass unit 5. As seen in FIGS. 3 and 5, the rod 25 extends horizontally along the horizontal section **23*a* of the slot 23 formed in the guide plate 22 through a space between the latter and the side wall of the housing 9. The rod 26 is provided with an interlock plate 27** extending vertically downwards.

The interlock plate 27 is provided with a locker piece 28 projecting towards the rod 26, a projecting 29 extending horizontally rearwards for depression of a limit switch, which will be described later in more detail, a horizontal guide slot 30 formed near the lower plate edge in order to rotatably receive a guide roller 31 mounted to the side wall of the housing 9, and a stopper 44 projecting horizontally from the lower plate edge towards the guide plate 22. The locker piece 28 is arranged at a position where it should abut against the first hook pin 18 on the first lever 17 to inhibit unintended extraction of the switch unit 2 from the housing 9 when the first contact 3 in the switch unit 2 is open. The stopper 44 extends along the upper edge of the horizontal section **24*a* of the lower slot 24 and is arranged at a position where it should abut against the second hook pin 21 on the second lever 20 to inhibit closure of the second contact 4 of the switch unit 2 when the by-pass unit 5** is closed.

As seen FIGS. 3 and 5, a lock pin 33 is vertically displaceably mounted to the side wall of the housing 9 by means of a support strap 32 at a level above the guide plate 22. The lock pin 33 is constantly urged to move downwards by a compression spring 34 attached to the support strap 32 and provided on its side facing the switch unit 2 with a roller 35. At the lowermost position, the lower end of the lock pin 33 abuts against the locker piece 28 of the interlock plate 27. When the switch unit 2 is at the operative position, the roller 35 rides on a guide projection 36 on the side wall of the switch unit 2 to hold the lock pin 33 at the uppermost position.

A lock plate 37 is horizontally mounted to the bottom of the housing 9 and provided with a pair of apertures 38 and 39 spaced apart in the moving direction of the switch unit 2. Facing this arrangement, a lock pin 41 is vertically displaceably attached to the front bottom edge of the switch unit 2 by means of a support strap 40. The lock pin 41 is accompanied with a control lever 42 projecting forwards and constantly urged to move downwards by means of compression spring 43 attached to the support strap 40. At the lowermost position, the lock pin 41 is brought into engagement with one of the apertures 38 and 39 in the lock plate 37 to inhibit unintended displacement of the switch unit 2.

The device is provided with three sets of limit switches LS1 to LS3. The first limit switch LS1 is mounted to a side wall of the housing 9 and, when the by-pass unit 5 is closed, pushed by the projection 29 of the interlock plate 27 to open its contact. The second limit switch LS2 is mounted to the front face of the switch unit 2 at a position just above the lock pin 41 as shown in FIG. 4 and, when the lock pin 41 is pulled up out of engagement with the aperture 38 or 39, is pushed by the lock pin 4 to open its contact. Again shown in FIG. 4, the third limit switch LS3 is mounted to a side wall of a housing 9 on the front side of the switch unit 2 and, when the switch unit 2 is extracted to the inoperative position, pushed by a projection 45 provided on a side face of the switch unit 2 to close its contact.

The operation of the device will now be explained in additional reference to FIGS. 6 to 10.

Under the condition shown in FIGS. 1, 4 and 5, the switch unit 2 is registered at the operative position in the housing 9 but the first and second contacts 3 and 4 are still left open. Since the first hook pin 18 responsive in movement to the first contact 3 is located on the path of travel of the locker pin 28 responsive in movement to the control lever 25 of the by-pass unit 5 as shown in FIG. 5, the control lever 25 cannot be turned for closure in the clockwise direction in FIG. 4.

Under the condition above in FIG. 6A, the switch unit 2 is located at the operative position and the first contact 3 is closed. Further, under the condition shown in FIG. 6B, the first contact 3 is closed and the by-pass unit 5 is still left open. In this state, the first hook pin 18 of the switch unit 2 stays in the vertical section 23*b* of the upper slot 23 in the guide plate 22, the path of travel of the locker piece 28 is left free and the by-pass unit 5 can be closed. As the first power source is connected to the load circuit via the switch unit 2, no arc discharge is caused by galvanization of the by-pass unit 5 and, as a consequence, there is no danger of contact damage. Under the condition shown in FIG. 6C, the by-pass unit 5 is closed. This state of the circuit is shown in FIG. 6D.

Under the condition shown in FIG. 7A, the switch unit 2 is located at the operative position, the first and second contacts 3 and 4 are both open and the by-pass unit 5 is now closed. As a result, the first power source is connected to the load circuit via the by-pass unit 5. Since, as shown in FIG. 7B, the first hook pin 18 of the switch unit 18 responsive in movement to the first contact 3 stays on the path of travel of the locker piece 28 responsive in movement to the control lever 25, the control lever 25 again cannot be turned for closure in the clockwise direction in FIG. 7A. As a consequence, no arc discharge is caused by galvanization of the by-pass circuit 5 and there is danger of contact damage.

Next, closure of the first and second contacts 3 and 4 will be explained. When the switch unit 2 is at the operative position in FIG. 4, the lock pin 41 is in engagement with the rear aperture 39 in the lock plate 37 as shown in FIG. 5 and the second limit switch LS2 is closed as shown in FIG. 7A. As a consequence, closure commands are passed to a control circuit of the switch unit 2 in FIG. 10 to cause electromagnetic closure of the contact 3 or 4. When the by-pass unit 5 is closed as shown in FIGS. 7A and 7B, the first limit switch LS1 is made open being pushed the projection 29 on the interlock plate 27 and the closure command is not handed over to the control circuit of the switch unit 2. As a result, the second contact 4 of the switch unit 2 cannot be electrically closed. Further, inasmuch as the stopper 44 covers the vertical section 24*b* of the lower slot 24 in the guide plate 22 to stay in the path of travel of the second hook pin 21 responsive in movement to the second contact 4 of the switch unit 2, the second contact 4 cannot be mechanically closed too. Thus, concurrent connection of the first and second power sources is reliably inhibited. This state of the circuit is shown in FIG. 7C.

Next, extraction of the switch unit 2 to the inoperative position will be explained. Such extraction is necessary for the purpose of maintenance and/or testing of the device elements. When the first contact 3 of the switch unit 2 is closed as shown in FIG. 6D, the first hook pin 18 stays in the vertical section 23*b* of the upper slot 23 in the guide plate 22 as shown in FIG. 6C and, as a consequence, the switch unit 2 cannot be extracted from the housing 9.

When the second contact 4 of the switch unit 2 is closed and the by-pass unit 5 is left open, the second hook pin 21 stays in the vertical section 24*b* of the lower slot 24 in the guide plate 22 as shown with a phantom line in FIG. 6B and, as a consequence, the switch unit 2 cannot be extracted from the housing 9 too.

When the contacts 3 and 4 of the switch unit 2 and the by-pass unit 5 are all open as shown in FIG. 1, the first hook pin 18 stays in the path of travel of the locker piece 28 as shown in FIG. 5 and, as a consequence, the switch unit 2 cannot be extracted from the housing 9 too.

When the contacts 3 and 4 of the switch unit 2 are open and the by-pass unit 5 is closed as shown in FIG. 7C, the first hook pin 18 does not stand in the path of travel of the locker piece 28 as shown in FIG. 7B and, as a consequence, the switch unit 2 can be extracted from the housing 9. Even when the switch unit 2 is registered at the inoperative position, the first power source is connected to the load circuit via the by-pass unit 5 and no interception of power supply starts.

In the state shown in FIG. 8A, the switch unit 2 is located between the operative and inoperative positions. In this case, the lock pin 41 is kept at the uppermost position and the second limit switch LS2 is open. No closure command is passed to the control circuit of the switch unit 2 and the contacts 3 and 4 cannot be electrically closed. Further, because the first hook pin 18 abuts against the lower edge 46 of the horizontal section 23*a* of the upper slot 23 in the guide plate 22 and the second hook pin 21 abuts against the upper edge 47 of the horizontal section 24*a* of the lower slot 24, the contacts 3 and 4 cannot be mechanically closed also. In addition, as the lock pin 33 is at the lowermost position and stands in the path of travel of the locker piece 28, the by-pass unit 5 cannot be open.

Next, explanation will be made to a state in which the switch unit 2 is registered at the inoperative position as shown in FIG. 9A. In this case, the lock pin 41 on the switch unit 2 falls into the front aperture 38 in the lock plate 37 and the third limit switch LS3 is pressed by the projection 45 on the switch unit 2. As a result, the limit switches LS2 and LS3 are both closed. Because the closure commands are passed to the control circuit of the switch unit 2 in FIG. 10, the first and second contacts 3 and 4 are both electrically closed to enable free maintenance and/or testing. Under this condition, the lock pin 31 is at the lowermost position in the path of travel of the locker piece 28 as shown in FIG. 9B and, as a consequence, the by-pass unit 5 cannot be open.

Next, explanation will be made to travel of the switch unit 2 from the inoperative to operative position. When the by-pass unit 5 is fully closed and only the first contact 3 of the switch unit 2 is closed as shown in FIG. 9C, the first hook pin 18 abuts against the front edge 48 of the guide plate 22 and, as a result, the switch unit 2 cannot be inserted into the housing 9.

When the by-pass unit 5 is closed and only the second contact 4 of the switch unit 2 is closed, the second hook pin 21 abuts against the front edge 48 of the guide plate 22 as shown with a phantom line in FIG. 9B and, as a result, the switch unit 2 cannot be inserted into the housing 9 also.

Only when the contacts 3 and 4 are both open as shown in FIG. 8C, the switch unit 2 can be inserted into the housing 9. When the switch unit 2 is registered at the operative position, the guide projection 36 lifts the lock pin 33 as shown in FIG. 7B and the interlocking between the position of the switch unit 2 and the operation of the by-pass unit 5 is canceled.

As is clear from the foregoing description, the present invention is based upon a tactful combination of an extractable arrangement of the switch unit with respect to the housing, use of a by-pass unit interposed between the first power source and the load unit and interlocking between the pollution of the switch unit and the operation of the by-pass unit. Thanks to such a combination, incorrect connection to the power sources and contact damage due to arc discharge can be both avoided successfully.

We claim:

1. An improved switching device comprising a housing internally provided with a first contact piece connected to a first power source, a second contact piece connected to a second power source and a third contact piece connected to a load circuit, a switch unit removably located in said housing and provided with first and second input pieces connectable to said first and second contact pieces respectively, an output piece connectable to said third contact piece, a first contact separably connecting said first input piece to said output piece and a second contact separably connecting said second input piece to said output piece, when said switch unit is registered at an operative position within said housing, a by-pass unit for separably connecting said first contact piece to said third contact piece;

a first interlocking means for inhibiting operation of said by-pass unit when said first contact is open, a second interlocking means for inhibiting closure of said second contact when said by-pass unit is closed, and a third interlocking means for permitting extraction of said switch unit from said housing when said by-pass unit connects said first contact piece to said third contact piece and said first contact is open.

2. An improved switching device as claimed in claim 1 in which said first interlocking means includes a first engage unit responsive to said first contact and a lock unit responsive to said by-pass unit, said first engage unit prevents travel of said lock unit to be caused by operation of said by-pass unit when said first contact is open, thereby inhibiting operation of said by-pass unit, said second interlocking mechanism includes a stop unit responsive to said by-pass unit and a second engage unit responsive to said second contact, said stop unit prevents travel of said second engage unit to be caused by closure of said second contact when said by-pass unit is closed, thereby inhibiting closure of said second contact, said third interlocking mechanism includes said lock unit responsive to said by-pass unit and said first engage unit responsive to said first contact, and said lock unit prevents travel of said first engage unit to be caused by extraction of said switch unit from said housing when said by-pass unit is open, thereby inhibiting extraction of said switch unit from said housing.

3. An improved switching device as claimed in claim 2 in which said lock unit responsive to said by-pass unit is arranged on a lever for operation of said by-pass unit, said lever is arranged between a side face of said switch unit and said housing, and said first engage unit responsive to said first contact and said second engage unit responsive to said second contact arranged near said side face of said switch.

* * * * *